(12) United States Patent
Miller et al.

(10) Patent No.: US 11,599,447 B2
(45) Date of Patent: Mar. 7, 2023

(54) DETECTION OF RUNTIME ERRORS USING MACHINE LEARNING

(71) Applicant: MICROSOFT TECHNOLOGY LICENSING, LLC., Redmond, WA (US)

(72) Inventors: Shaun Miller, Sammamish, WA (US); Kalpathy Sitaraman Sivaraman, Redmond, WA (US); Neelakantan Sundaresan, Bellevue, WA (US); Yijin Wei, Bellevue, WA (US); Roshanak Zilouchian Moghaddam, Kirkland, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 0 days.

(21) Appl. No.: 17/857,039

(22) Filed: Jul. 4, 2022

(65) Prior Publication Data
US 2022/0342800 A1    Oct. 27, 2022

Related U.S. Application Data

(63) Continuation of application No. 16/805,673, filed on Feb. 28, 2020, now Pat. No. 11,403,207.

(51) Int. Cl.
| | |
|---|---|
| *G06F 9/44* | (2018.01) |
| *G06F 11/36* | (2006.01) |
| *G06N 20/10* | (2019.01) |
| *G06N 5/00* | (2023.01) |

(52) U.S. Cl.
CPC ...... *G06F 11/3644* (2013.01); *G06F 11/3624* (2013.01); *G06N 5/003* (2013.01); *G06N 20/10* (2019.01)

(58) Field of Classification Search
None
See application file for complete search history.

(56) References Cited

U.S. PATENT DOCUMENTS

| | | | | |
|---|---|---|---|---|
| 6,085,029 | A * | 7/2000 | Kolawa | G06F 11/3624 714/38.13 |
| 9,244,755 | B2 * | 1/2016 | Huang | G06F 11/0775 |
| 11,057,274 | B1 * | 7/2021 | Kumar | H04L 41/12 |
| 2008/0263063 | A1 * | 10/2008 | Sceppa | G06F 9/45516 |
| 2013/0339929 | A1 * | 12/2013 | Logozzo | G06F 9/44589 717/124 |
| 2015/0286820 | A1 * | 10/2015 | Sridhara | G06F 21/566 726/23 |
| 2016/0371133 | A1 * | 12/2016 | Jhunjhunwala | G06F 11/0709 |
| 2020/0125963 | A1 * | 4/2020 | von Trapp | G06N 7/005 |

* cited by examiner

*Primary Examiner* — Qamrun Nahar

(57) ABSTRACT

Runtime errors in a source code program are detected in advance of execution by machine learning models. Features representing a context of a runtime error are extracted from source code programs to train a machine learning model, such as a random forest classifier, to predict the likelihood that a code snippet has a particular type of runtime error. The features are extracted from a syntax-type tree representation of each method in a program. A model is generated for distinct runtime errors, such as arithmetic overflow, and conditionally uninitialized variables.

15 Claims, 9 Drawing Sheets

DETECTION OF RUNTIME ERRORS USING MACHINE LEARNING

BACKGROUND

A runtime error is an error in a software program that occurs during the execution of the program. Runtime errors are often not detected by a compiler. Compiler-detected errors are a non-issue if properly corrected and fixed before the program executes. Runtime errors that are not detected by a compiler are more dangerous since they are less likely to be noticed and can cause severe consequences such as incorrect outputs, corrupted data, and/or program crashes. These errors become more obscure and difficult to detect as the size of the program increases and the complexity of the program includes a large number of execution paths. The detection of runtime errors before a program executes is critical for programmer productivity and the development and maintenance of the program.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Runtime errors in a source code program are detected before program execution using machine learning models. The machine learning models are trained to detect a particular type of runtime error using code snippets containing the runtime error and code snippets without the runtime error. In one aspect, the machine learning models are random forest models that classify input features of a snippet of code of unseen data as likely to have a particular runtime error. The random forest models are used to predict the probability of a code snippet containing two different types of runtime errors: conditionally uninitialized variable and arithmetic overflows.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

Aspects of the present invention pertain to the detection of runtime errors before program execution using machine learning models. A machine learning model is trained to detect a particular type of runtime error using code snippets containing the runtime error and code snippets without the runtime error. In one aspect, the machine learning models are random forest classifiers that classify input features of a code snippet from training datasets having positive and negative training examples.

The random forest models are trained on features extracted from code snippets that represent the context of the runtime error and the context where the runtime error does not exist. A context is represented by the arrangement and relationship of the parts and elements of program statements surrounding the runtime error (i.e., syntax) and the types of the variable used in this context. The models are used to predict the probability of a code snippet containing one of two different types of runtime errors: conditionally uninitialized variable and arithmetic overflows.

Conditionally uninitialized variable is a runtime error that is frequent in programming languages that trade safety for performance. This type of runtime error occurs in a method or function invocation with an argument that is passed by reference that has not been initialized. This is due to the creation of stack and heap objects that are uninitialized thereby leading to the use of uninitialized variables. Memory is reallocated and reused in most applications and contains data from previous function calls or previously-freed allocations. Uninitialized data creates problems when the data is not initialized before use, thereby containing the old data in the new allocation. The uninitialized data may trigger a software bug and/or security vulnerability which may not be detected during compilation. Such software bugs are hard to find during testing since they may not lead to a program failure on every execution.

Programming languages such as Java and C# alleviate this problem by enforcing the assignment of variables on all possible paths of execution. C and C++ do not enforce this condition and as a result a vast number of existing C/C++ programs included in libraries and applications are vulnerable to program failures or security attacks.

Arithmetic overflow is another type of runtime error that is the result of a calculation exceeding the memory space designated to hold the result. Division by zero, storing an out-of-range floating point value into a numeric variable, and integer overflow are instances of arithmetic overflow. Some programming languages, such as C/C++, ignore arithmetic overflows by default due to the cost of checking for these errors in order to improve program performance.

Attention now turns to a further discussion of the system, devices, components, and methods utilized in detecting runtime errors.

System

Figure 1A:
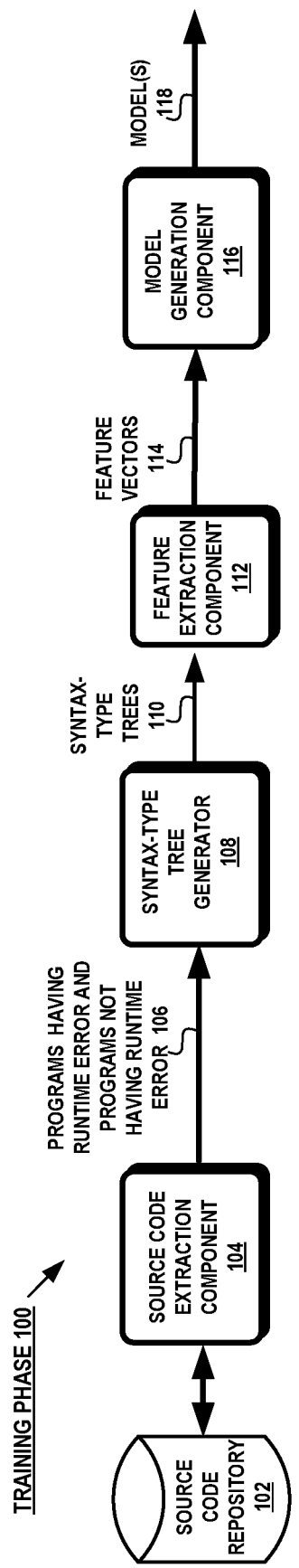
FIGS. 1A-1B illustrate an exemplary system having a training phase and an inference phase to train machine learning models to detect runtime errors prior to program execution.
Figure 1B:
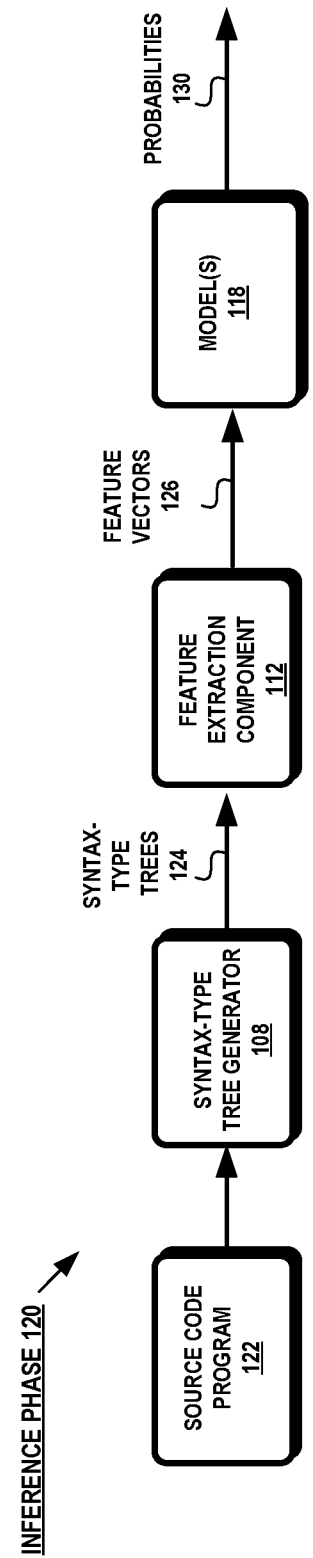

FIGS. 1A and 1B illustrate an exemplary system in which various aspects of the invention may be practiced. FIG. 1A illustrates a block diagram of an exemplary training phase 100 and FIG. 1B illustrates a block diagram of an exemplary inference phase 120. In the training phase 100, a model is generated for each type of runtime error and in the inference phase 120 one or more of the models are used to determine whether a program is likely to contain a runtime error. The training phase 100 may utilize a source code repository 102, a source code extraction component 104, a syntax-type tree generator 108, a feature extraction component 112, and a model generation component 116. The inference phase 120 may utilize the syntax-type tree generator 108, the feature extraction component 112 and one or more of the models 118.

In the training phase 100, the source code extraction component 104 extracts source code programs 106 from a source code repository 102 to find suitable code snippets to train are machine learning model. The source code repository 102 is a file archive and web hosting facility that stores large amounts of artifacts, such as source code files and a code base. Programmers (i.e., developers, users, end users, etc.) often utilize a shared source code repository 102 to store source code and other programming artifacts that can be shared among different programmers. A programming artifact is a file that is produced from a programming activity, such as source code, program configuration data, documentation, and the like. The shared source code repository 106 may be configured as a source control system or version control system that stores each version of an artifact, such as a source code file, and tracks the changes or differences between the different versions. Repositories managed by source control systems are distributed so that each user of the repository has a working copy of the repository. The source control system coordinates the distribution of the changes made to the contents of the repository to the different users.

In one aspect, the source code repository 102 is implemented as a cloud or web service that is accessible to various programmers through online transactions over a network. An online transaction or transaction is an individual, indivisible operation performed between two networked machines. A programmer may check out an artifact, such as a source code file, and edit a copy of the file in its local machine. When the user is finished with editing the source code file, the user performs a commit which checks in the modified version of the source code file back into the shared source code repository. A pull request informs others that changes have been made to one or more file which were pushed or committed back into the repository. From these pull requests, it can be determined which programs have been fixed to correct a particular runtime error and the original code snippet having the error.

A source code repository 102 may be privately accessible or publicly accessible. There are various types of shared source code repositories, such as without limitation, GitHub, BitBucket, CloudForge, ProjectLocker, SourceForge, LaunchPad, etc., and any one or combination thereof may be used herein.

The source code extraction component 104 selects those programs having been fixed to correct a particular runtime error and those programs not have been fixed with that particular runtime error. The programs having the runtime error and not having the runtime error are selected for use as the training dataset to train a model.

The syntax-type tree generator 108 performs static code analysis on the selected source code programs 106 to generate a corresponding syntax-type tree 110. The syntax-type tree generator may be a parser, a compiler, a static code analysis tool or the like. The static code analysis transforms the program into a sequence of tokens defined by the grammar of the programming language of the program. The syntax tree represents the syntactic structure of the program in a hierarchical or tree structure where a node represents a token occurring in the program. The syntax tree is augmented with type information of the variables used within the program and referred to herein as a syntax-type tree 110.

The syntax-type tree 110 of each selected source code program is passed to the feature extraction component 112. The feature extraction component 112 extracts certain features from the syntax-type tree of each method in a selected program. A feature is a discriminable characteristic that represents the context in which a runtime error occurs. There are several features extracted for each type of runtime error and these features are combined into a feature vector. A portion of the feature vectors 114 generated for a type of runtime error is used as training data for the model generation component 116 to train a model 118 and another portion of the feature vectors 114 can be used by the model generation component 116 to test the model 118.

The inference phase 120 uses the model 118 generated in the training phase 100 to determine whether a source code program or code snippet is likely to contain a runtime error or not. A source code program or code snippet 122 is parsed into a syntax-type tree 124 by the syntax-type tree generator 108. The feature extraction component 112 uses the syntax-type tree 124 to extract features that are input into a respective model as feature vectors 126. The model 118 then determines whether or not a runtime error is present in the program by generating probabilities 130 of the likelihood of a runtime error.

In one aspect, the machine learning model is a random forest classifier. A random forest is an ensemble-based machine learning technique for classification. This technique is constructed using multiple decision trees that are trained to produce a probability representing a classification or label identifying the class that represents the mode of the classes of the decision trees. A mode is the value in the training dataset that appears most frequently.

A random forest model M consists of a fixed number of decision trees, T, that vote to predict a classification on unseen data. Each decision tree consists of a root node, multiple internal nodes referred to as split nodes, and multiple leaf nodes. Each root and split node of each tree performs a binary test on each input training data or feature vector and performs a binary test and based on the result, directs the data to the left or right child node. The leaf nodes store a probability distribution.

Each node in a decision tree i provides a probability $p_i(y|x)$ for each $y \in L$, which is obtained during training the random forest, where y is a label out of the available labels L, and x represents a feature vector of n features. The final classification is obtained from a vote of all the trees, T, and the resulting label is assigned according to the following equation:

$$M(x) = \mathrm{argmax}_{y \in L} \frac{1}{T} \sum_{i=1}^{T} p_i(y|x).$$

This method of combining trees is an ensemble method. The individual decision trees are weak learners and the ensemble produces a strong learner. Decision trees can suffer from over-fitting which leads to poor generalization and a higher error rate. An ensemble of decision trees, such as a random forest, improves generalization.

Figure 2:
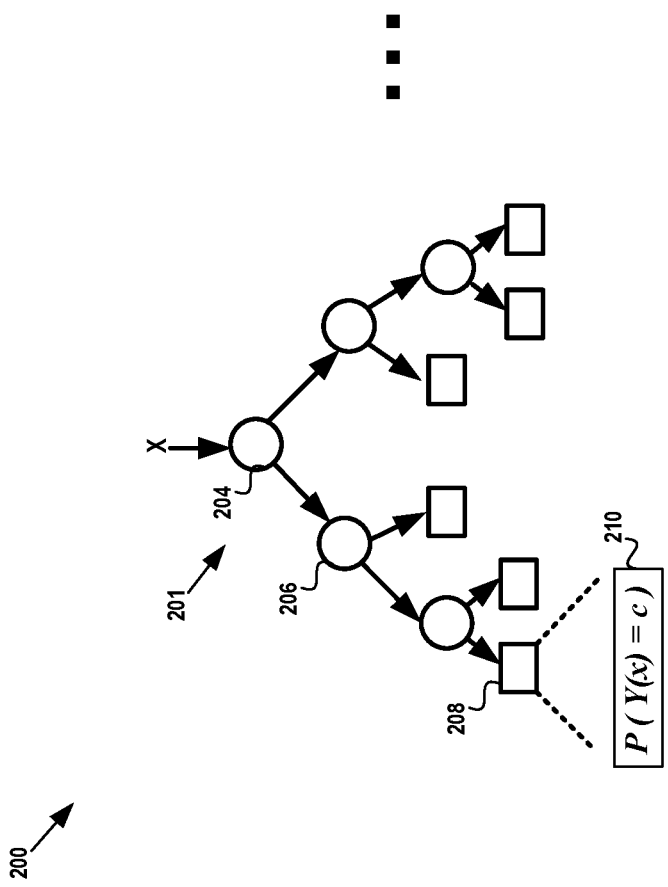
FIG. 2 is an exemplary illustration of a random forest containing multiple decision trees.

FIG. 2 shows a random forest 200 having T decision trees 201, 202. A decision tree, such as tree 201, comprises a root node 204, a plurality of internal or split nodes 206, and a plurality of leaf nodes 208. Each root and split node perform a binary test on the input data and based on the result directs the data to the left or right child node. The leaf nodes store a probability distribution 210.

A decision tree splits the data based on binary tests represented as if-else conditions. The binary tests divide a dataset into distinct and non-overlapping regions. The splitting decision is based on a node impurity, such as a Gini index or entropy, which measures the homogeneity of the labels at a node. Each split is chosen using a greedy algorithm that selects the best split that maximizes an information gain at each node. The information gain is the difference between the parent node impurity and the weighted sum of the two child node impurities. This is represented mathematically as follows:

$$IG(D, s) = \text{Impurity}(D) - \frac{N_{left}}{N}\text{Impurity}(D_{left}) - \frac{N_{right}}{N}\text{Impurity}(D_{right}),$$

where s is a split that partitions the training dataset S of size N into two datasets $D_{left}$ and $D_{right}$ of sizes $N_{left}$ and $N_{right}$, where the node impurity is $\Sigma_{i=1}^{C} f_i(1-f_i)$, where $f_i$ is the frequency of label i at a node and C is the number of unique labels when the Gini index is used, the node impurity is $\Sigma_{i=1}^{C} -f_i \log(1-f_i)$, when entropy is used.

Figure 3:
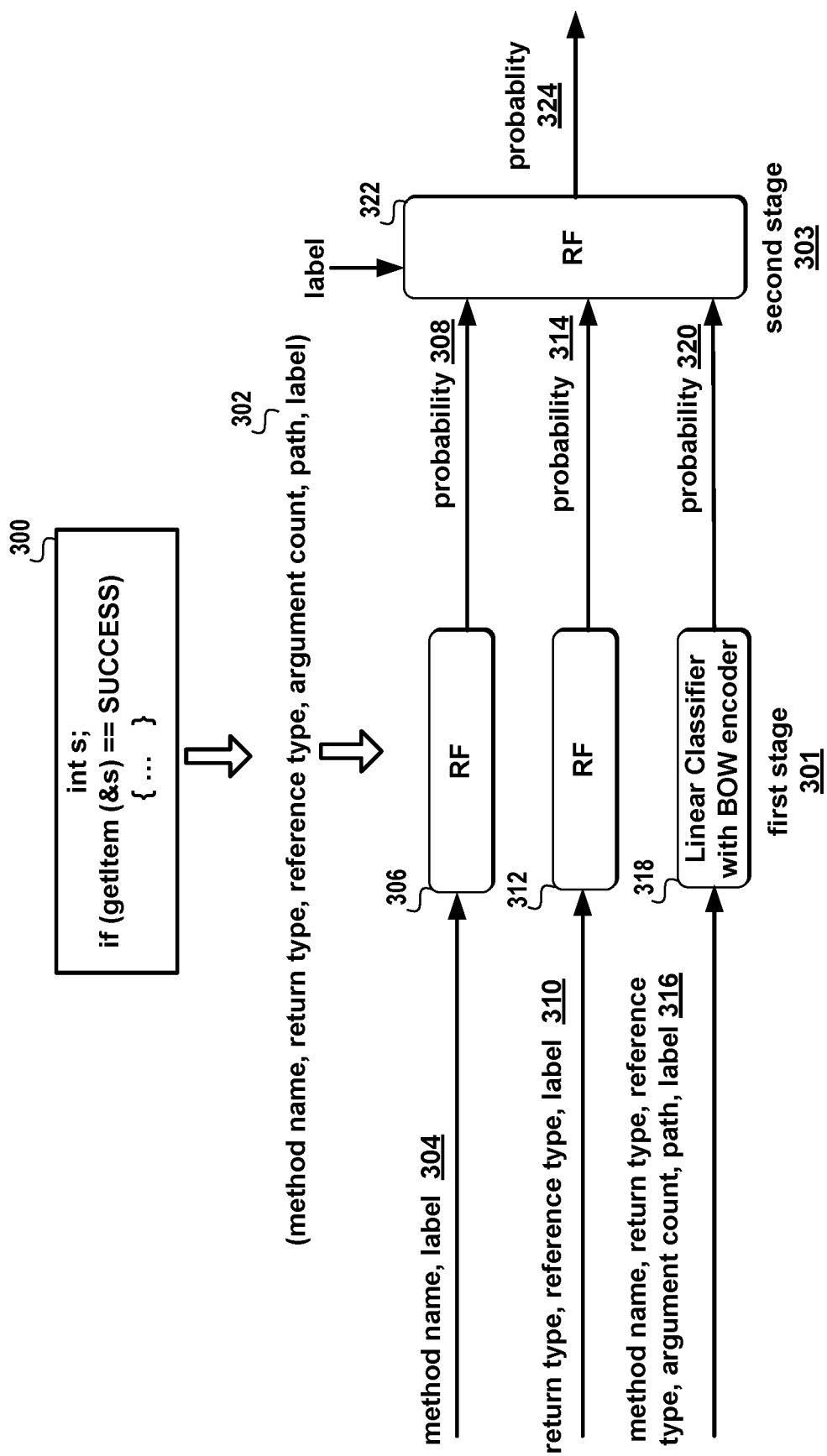
FIG. 3 is an exemplary configuration of a two-stage random forest classifier for the detection of a conditionally uninitialized variable runtime error.

FIG. 3 illustrates an exemplary configuration for training a random forest model to detect the conditionally uninitialized variable runtime error. This runtime error occurs when a method invocation passes a parameter or argument by reference, the reference parameter has not been initialized, and the method returns an integral value. As shown in the code snippet 300, the variable s is declared as an integer in the code statement int s. However, the variable s is not initialized before it is passed as a reference argument in the method invocation getItem.

The model is trained using a two-stage ensemble classifier. The training data contains imbalanced data where the amount of training data for both classes (runtime error or no runtime error) is different. The first stage 301 is utilized to train with a lower amount of data in order to improve the prediction accuracy and to control overfitting. The models used in the first stage focus on specific features and enable parameter tunings to detect those features. This results in the second-stage 303 being less complex and more accurate.

The models are trained with features 302 extracted from a syntax-type tree of a function. The features 302 represent the context of a potential runtime error in terms of the elements of the program statements encompassing the runtime error and the associated data types. A type or data type is a particular kind of data item, as defined by the values it can take, the programming language used, and the operations that can be performed on it.

The first-stage 301 includes the following: a first random forest 306 that trains on the method's name and a label 304; a second random forest 312 that trains on the return type of the method, the type of the reference parameter, and a label 310; and a linear classifier 318 that trains on a Bag-Of-Words (BOW) encoder using the method name, the return type of the method invocation, the type of the reference parameter, the argument count or number of parameters, path, and the label. Each of the random forests 306, 312 and the linear classifier 318 outputs a respective probability 308, 314, 320.

The label indicates whether the features are associated with the runtime error or not. The path is a list of tokens from the return type of the method invocation to the succeeding lines of code that utilize the return value from the method invocation. For example, in the code snippet 300, the path would include the tokens 'if' and '=='.

A linear classifier 318 uses a linear combination of the features to associate a classification with the features. The linear classifier 318 uses the BOW encoder to produce a numerical representation of the input words representing their frequency of occurrence in the training dataset disregarding the semantic relationship between the words. The BOW encoder encodes the function name, return type, argument count, reference type, and operators 316 into a numerical encoding 320 and the linear classifier 318 uses these features along with the label for training.

The third random forest 322 is trained using the probabilities from each random forest model 306, 312 and the linear classifier 318 to infer a label indicating whether the features of a code snippet indicate a runtime error or not from the probability distribution 324 output from the third random forest 322.

Figure 4:
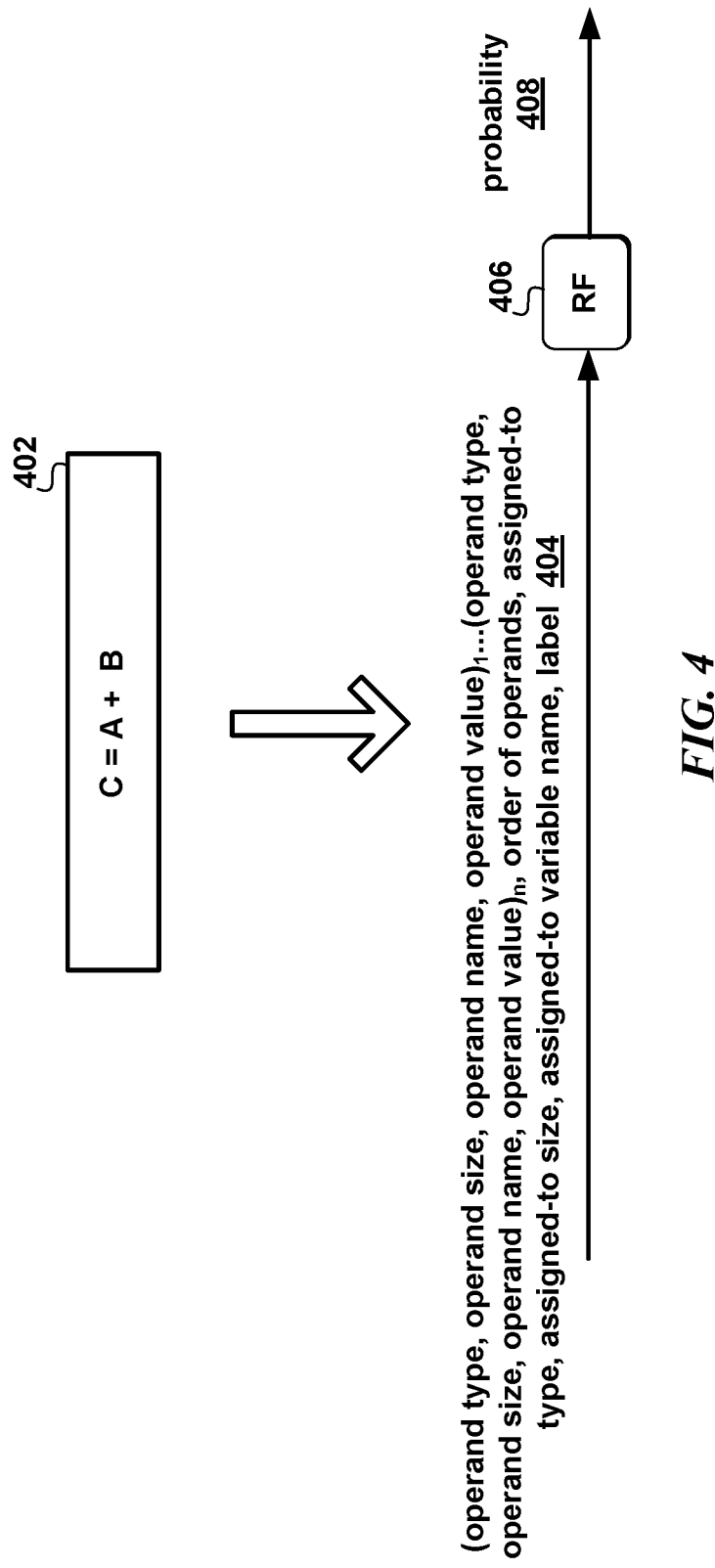
FIG. 4 is an exemplary configuration of a random forest classifier for the detection of an arithmetic overflow.

FIG. 4 illustrates an exemplary configuration for training a random forest model for detecting an arithmetic overflow. For this runtime error, a single random forest model is trained. An arithmetic expression is a syntactically-correct combination of symbols where the symbols consist of operands, operators, numbers, variables and delimiters. As shown in FIG. 4, the arithmetic expression 402 is C=A+B. The operators in this expression are A and B, the operator is the addition operator, +, and the assigned-to variable is C.

The features of the arithmetic expression that are input into the random forest 406 in a feature vector are as follows: operand type, operand size, operand name and operand value for each operand in the arithmetic expression; the order of the operands in the expression; the type of the variable assigned the result of the arithmetic expression ("assigned-to type"); the size of the variable assigned the result of the arithmetic expression ("assigned-to size"); the name of the variable assigned to the result of the arithmetic expression ("assigned-to variable name"); and the label. The label indicates whether the features are associated with an arithmetic overflow or not.

Methods

Attention now turns to a description of the various exemplary methods that utilize the system and devices disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 5:
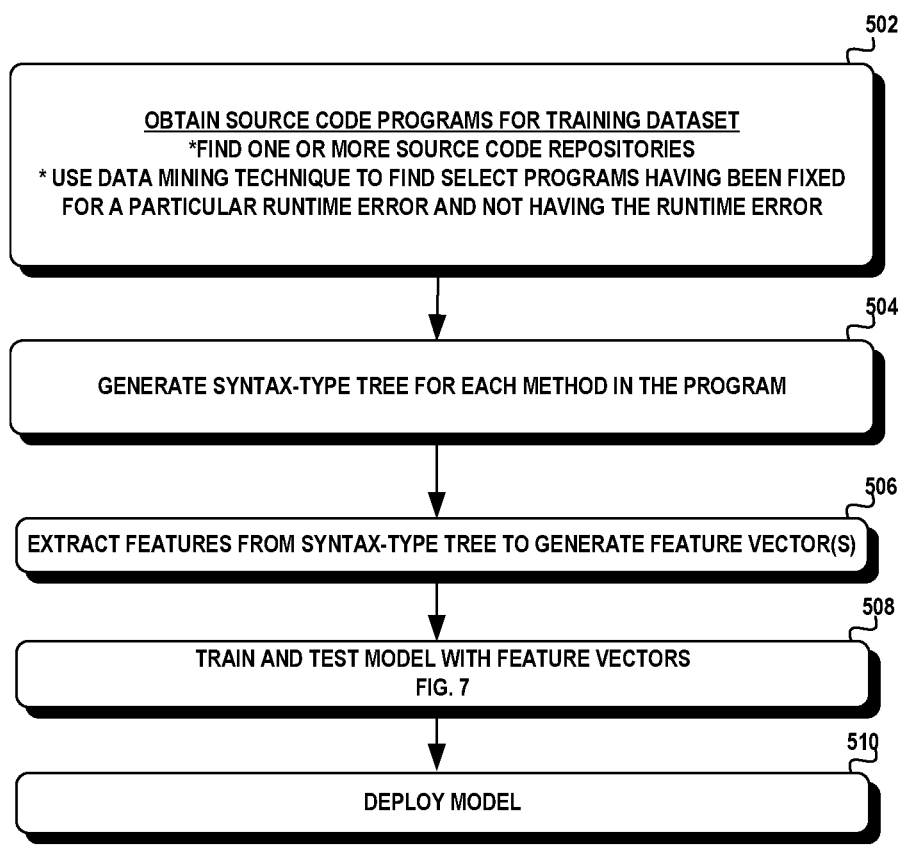
FIG. 5 is a flow diagram illustrating an exemplary method for generating a machine learning model to detect a runtime error in a program prior to execution.

FIG. 5 illustrates an exemplary method 500 for training a random forest model. Data used in the training dataset is obtained from source code programs having had the particular runtime error and those without it. In order to find examples of such source code programs, various source code repositories are used. Each source code repository is searched for fixes for the particular runtime error from a variety of source code programs in a repository. Additionally, a source code repository is searched from source code programs not having the runtime error. The source code programs are written in the same programming language. (Collectively, block 502).

Figure 6:
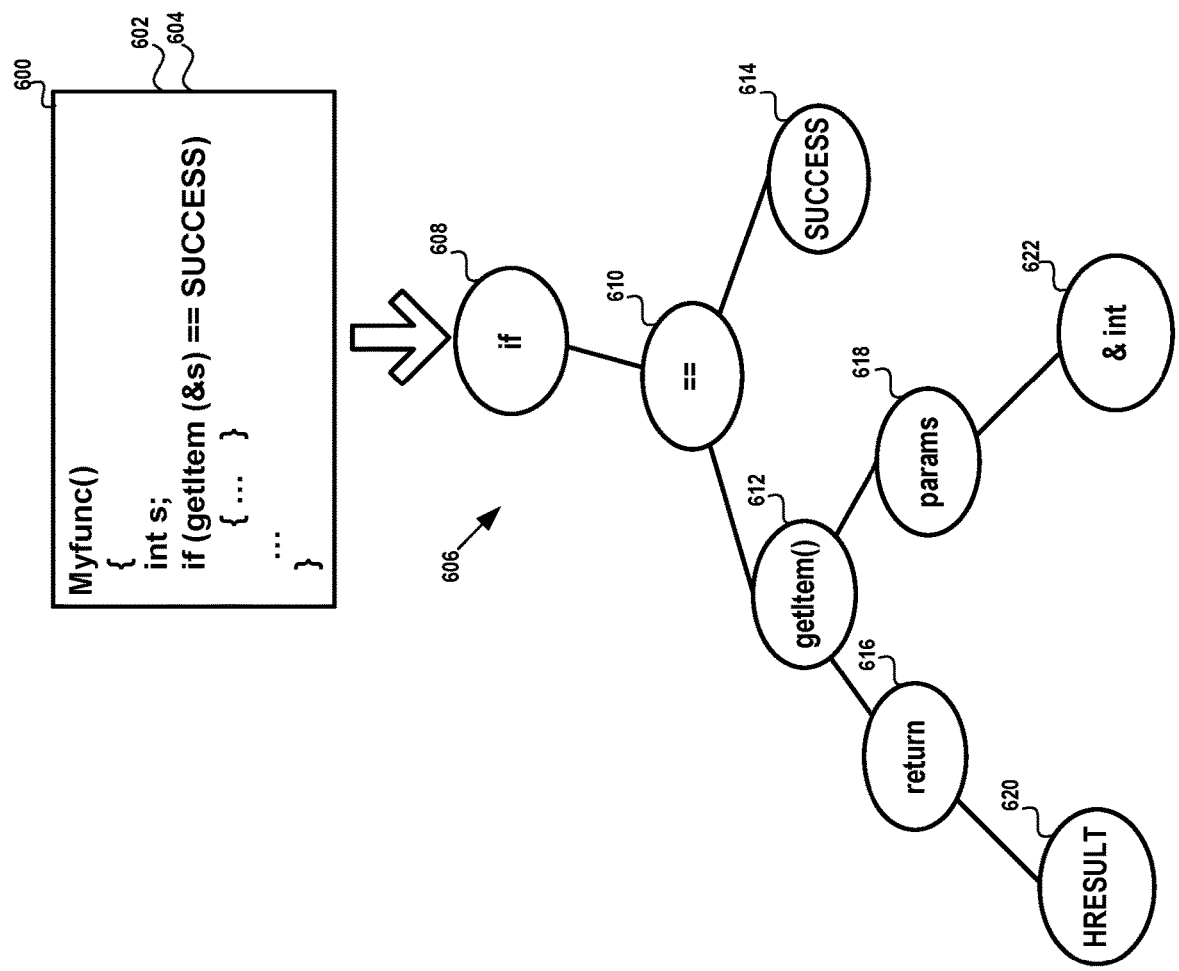
FIG. 6 is an exemplary illustration of the generation of a syntax-type tree for a code snippet.

Each method in a selected source code program is then parsed into a syntax-type tree (block 504). Turning to FIG. 6, there is shown a code snippet 600 of the method MyFunc( ) The method includes a declaration statement 602 that declares the variable s to be an integer type. The variable is not initialized with a value before it is used as a reference parameter in a method invocation to the method getItem( ) 604. The result of the call to method getItem is used in a conditional expression which checks if the result is equal to the value of the constant SUCCESS. This is a classic conditionally uninitialized variable scenario.

The corresponding syntax-type tree for a portion of the method MyFunc is shown in tree 606. The tree is a hierarchical structure that represents the derivation of the grammar of a programming language of the source code to generate input strings. The root node 608 is the start token or symbol of the given grammar from which the derivation begins. The internal nodes 610, 612, 614, 618, 620 represent productions of the grammar. The leaves 620, 622, 614 represent terminal nodes. The children of a node T represent from left to right the symbols on the right-hand side of a production for T in the tree.

Turning back to FIG. 5, the features for each model is extracted from the syntax-type tree (block 506). The tree of a method is traversed to detect paths that represent a particular runtime error such as the conditionally uninitialized variable or arithmetic overflow. For the conditionally uninitialized variable scenario, a search is made for subtrees that represent a variable declaration and for subtrees that represent usage of the declared variables. Subtrees that represent the assignment of a value to a variable are found and control flow information is searched to discover whether a statement with an initialization function (i.e., method invocation) is reachable from the assignment.

Each respective model is trained using a training dataset including a particular set of feature vectors extracted from multiple source code programs and tested with a set of the training dataset until the model performs as intended (block 508).

The model is then deployed (block 510). The model may be used in a compilation tool, software development environment or as part of an integrated development environment (IDE). Alternatively, the model may be used as part of cloud service or as a stand-alone tool.

Figure 7:
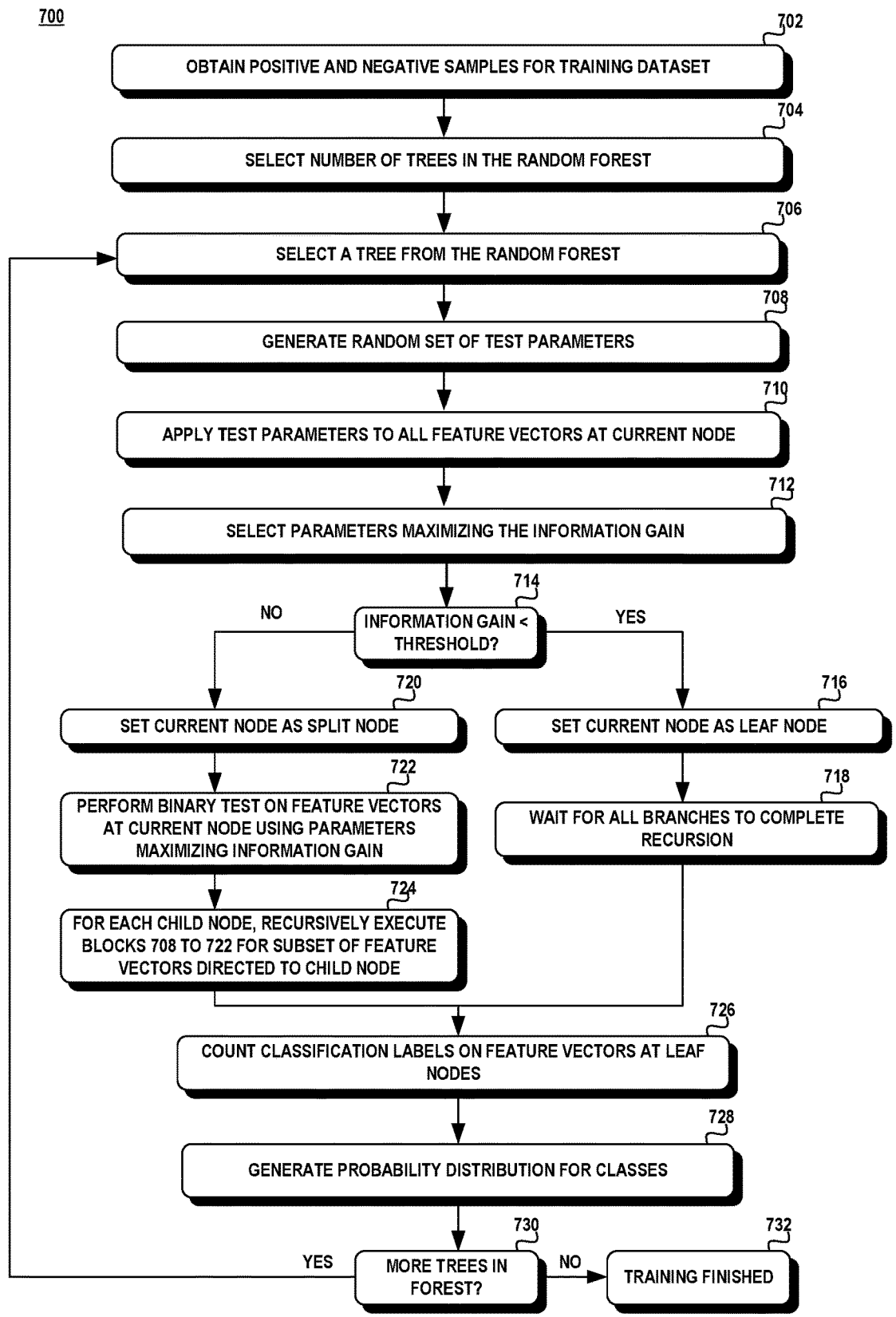
FIG. 7 is a flow chart illustrating an exemplary method for training a random forest model for the detection of a runtime error.

Attention now turns to an exemplary method for training a random forest. Turning to FIG. 7, the method 700 described in FIG. 7 is suitable for training any of the random forests disclosed herein.

The training dataset for a model which includes positive and negative samples is obtained. The positive samples are feature vectors representing features associated with a runtime error and the negative samples are feature vectors representing features associated without a particular runtime error (Collectively, block 702).

Initially, the number of trees for each random forest is pre-configured to a particular number (block 704). The process starts by selecting a decision tree from the random forest (block 706). A random set of test parameters are then generated for use by the binary tests performed at the root node (block 708).

The binary test is of the form: $\alpha > f(x; \theta) > \beta$, such that $f(x; \theta)$ is a function applied to a feature vector x with parameters $\theta$, and with the output of the function compared to threshold values $\alpha$ and $\beta$. If the result of $f(x; \theta)$ is in the range between $\alpha$ and $\beta$ then the result of the binary test is true. Otherwise, the result of the binary test is false. The result of the binary test performed at a split node determines which child node a feature vector is passed to. (Collectively, block 710).

The random set of test parameters generated comprise a set of random values for the function parameter $\theta$ and the threshold values $\alpha$ and $\beta$. The function parameters of $\theta$ of each split node are optimized over a subset $\theta$ of all possible parameters. Then, every combination of a test parameter is applied to each feature vector. For each combination, the information gain is calculated. The combination of parameters that maximizes the information is selected and stored at the current node for further use. (Collectively, block 712).

Next, it is determined whether the value for the maximized information gain is less than a threshold (block 714). If the value for the information gain is less than the threshold (block 714-yes), then this indicates that further expansion of the tree does not provide significant benefit and the current depth of the tree is determined. If this is greater than a predefined maximum value, then the current node is set as the leaf node (block 716) and the process waits for all branches to complete recursion (block 718).

If the value for the maximized information gain is greater than or equal to the threshold (block 714-no), and the tree depth is less than the maximum value, then the current node is set as a split node (block 720).

As the current node is a split node, it has child nodes, and the process then moves to training these child nodes. Each child node is trained using a subset of the feature vectors at the current node. The subset of feature vectors sent to a child node is determined using the parameters that maximize the information gain. These parameters are used in the binary test, and the binary test performed on all feature vectors at the current node (block 722). The feature vectors that pass the binary test form a first subset sent to a first child node, and the feature vectors that fail the binary test form a second subset sent to a second child node.

For each of the child nodes, the process shown in blocks 708 to 722 is recursively executed for the subset of feature vectors directed to the respective child node. In other words, for each child node, new test parameters are generated, applied to the respective subset of feature vectors, parameters maximizing the information gain selected, and the type of node is determined. If it is a leaf node, then the current branch of recursion ceases. If it is a split node, binary tests are performed (block 722) to determine further subsets of feature vectors and another branch of recursion starts. Therefore, this process recursively moves through the tree, training each node until leaf nodes are reached at each branch. As leaf nodes are reached, the process waits until the nodes in all branches have been trained (block 718).

Once all the nodes in the tree have been trained to determine the parameters for the binary test maximizing the information gain at each split node, and leaf nodes have been selected to terminate each branch, the probability distribution can be determined for all the leaf nodes of the tree (block 726). This is achieved by counting the class labels of the feature vectors that reach each of the leaf nodes (block 728). All the features from the feature vectors end up at a leaf node of the tree.

Once the probability distribution has been determined for the leaf nodes of the tree, then if more trees are present (block 730-yes), the process repeats. If all the trees in the forest have been trained (block 730-no), then the training process is complete (block 732). Hence, the training process generates multiple decision trees trained using the training dataset. Each tree comprises multiple split nodes storing optimized test parameters and leaf nodes storing associated probability distributions.

Figure 8:
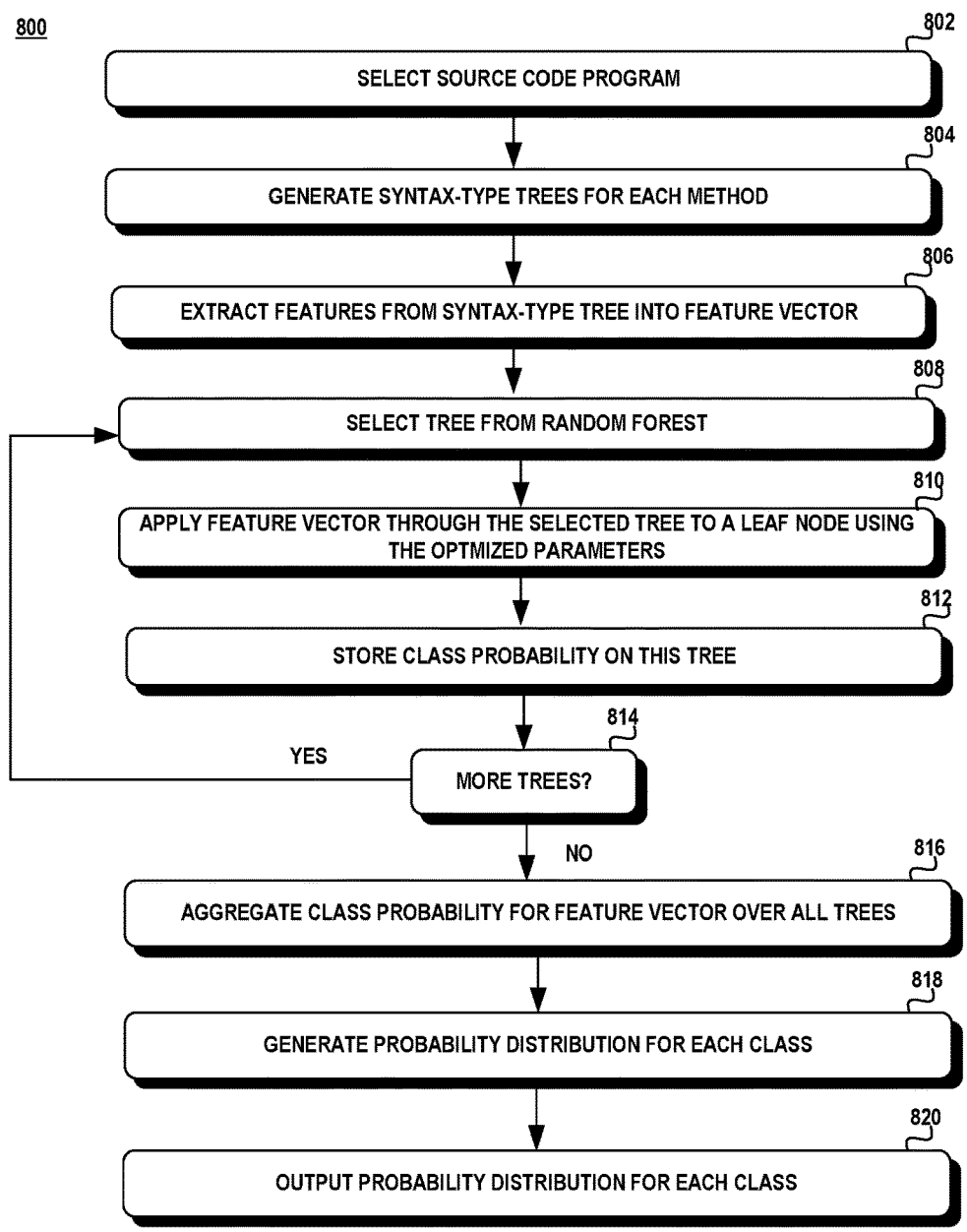
FIG. 8 is a flow chart illustrating an exemplary method for using a random forest model to detect a runtime error.

Attention now turns to the use of a random forest in inferring the likelihood of a particular runtime error. Turning to FIG. 8, there is shown an exemplary method 800 for detecting runtime errors using one or more random forest models. A source code program or code snippet is selected for analysis by one or more of the trained random forest models (block 802). The syntax-type tree generator parses the source code program to generate a syntax-type tree for each method in the program (block 804). The feature extraction component extracts the appropriate features from each syntax-type tree to form a feature vector for a respective model (block 806).

The feature vector is applied to each tree in the random forest for classification. A trained decision tree from the random forest is selected (block 808) and is tested against the trained and optimized parameters in each binary test in each node (block 810). Based on the result of the test, the feature vector is passed to the appropriate child node (block 810). The process is repeated until the feature vector reaches a leaf node (block 810). Once the feature vector reaches a leaf node, the probability distribution associated with this leaf node it stored for this feature vector (block 812).

If there are more decision trees in the random forest (block 814-yes), a new decision tree is selected (block 808). The feature vector is pushed through the tree (block 810) and the probability distribution stored (block 812). This is repeated until there are no more decision trees in the random forest (block 814-no). Once the feature vector has been applied to each tree in the random forest (block 814-no), then the stored probability distributions that have been stored are aggregated (block 816) to form the overall probability distribution for each class (block 818). The overall probability distribution for each class is then output (block 820).

Exemplary Operating Environment

Figure 9:
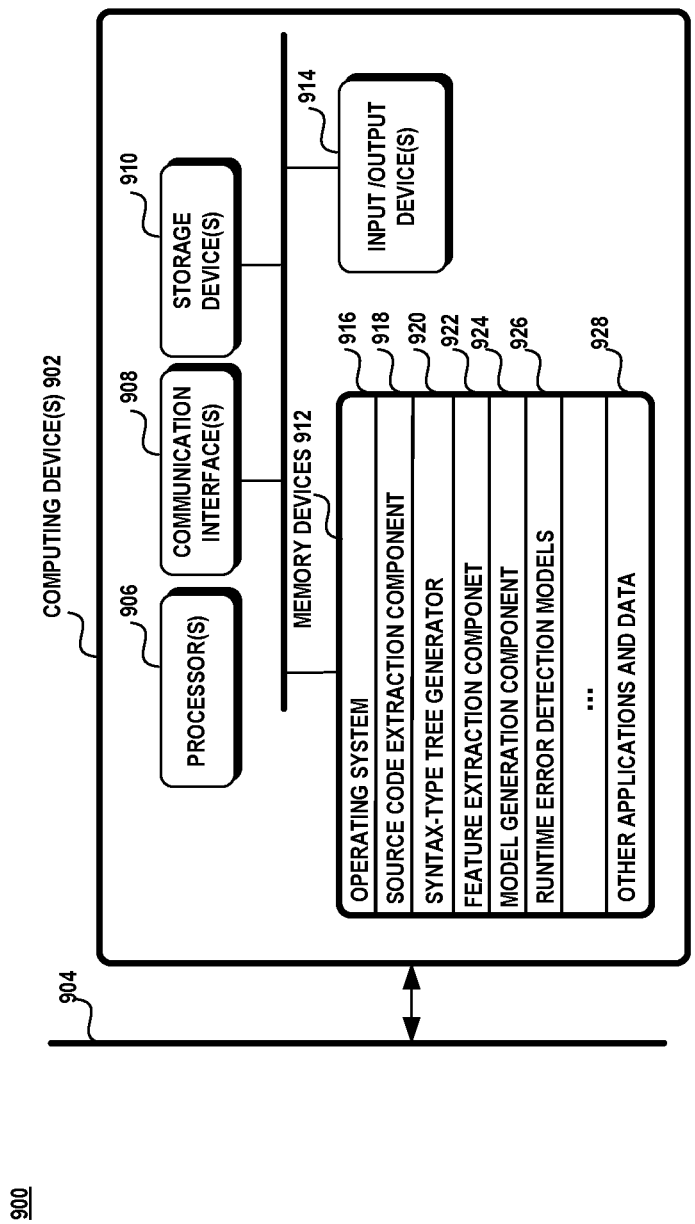
FIG. 9 is a block diagram illustrating an exemplary operating environment.

Attention now turns to a discussion of an exemplary operating environment. FIG. 9 illustrates an exemplary operating environment 900 used to generate machine learning models to predict the likelihood of a code snippet containing a runtime error. The operating environment 900 may be configured as a cloud service having multiple computing devices 902 or configured as a single computing device. The computing devices 902 are coupled to a network 904 to other computing devices. However, it should be noted that the aspects disclosed herein is not constrained to any particular configuration of devices and that other configurations are possible.

A computing device 902 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, an Internet-of-Things (IOT) device, a distributed computing system, multiprocessor systems, or combination thereof. The operating environment 900 may be configured in a network environment, a distributed environment, a multi-processor environment, or a stand-alone computing device having access to remote or local storage devices.

A computing device 902 may include one or more processors 906, one or more communication interfaces 908, one or more storage devices 910, one or more input/output devices 914 and one or more memory devices 912. A processor 906 may be any commercially available or customized processor and may include dual microprocessors and multi-processor architectures. A communication interface 908 facilitates wired or wireless communications between the computing devices and other devices.

A storage device 910 may be computer-readable medium that does not contain propagating signals, such as modulated data signals transmitted through a carrier wave. Examples of a storage device 910 may include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices in a computing device. The input/output devices 914 may include a keyboard, mouse, pen, voice input device, touch input device, display, speakers, printers, etc., and any combination thereof.

A memory device 912 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory device 912 may also include one or more external storage devices or remotely located storage devices that do not pertain to propagated signals, such as modulated data signals transmitted through a carrier wave.

Memory devices 912 may include an operating system 916, a source code extraction component 918, syntax-type tree generator 920, feature extraction component 922, model generation component 924, one or more runtime error detection models 926, and other application and data 928.

Network 904 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

A network 904 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Conclusion

A system is disclosed having one or more processors coupled to a memory. The memory includes one or more programs that are configured to be executed by the one or more processors. The one or more programs including instructions that: obtains, from a source code program, features associated with a first type of runtime error in one or more program statements of the source code program; and use a random forest classifier to classify the features into one of two classes. A first one of the classes indicates that the features represent the first type of runtime error and the second one of the classes indicates that the features do not represent the first type of runtime error.

In one aspect, the first type of runtime error pertains to the use of an uninitialized variable as a reference parameter in a method invocation that returns an integral result. In another aspect, the first type of runtime error is an arithmetic overflow of an arithmetic operation. The arithmetic operation has one or more operands, one or more operators, and an assigned-to variable.

In one aspect, the features associated with the first type of runtime error includes name of the method invocation, return type of the method invocation, type of the reference parameter, and argument count. In another aspect, the features associated with the first type of runtime error includes type and size data of each of the one or more operands and the assigned-to variable, an order of the one or more operands, and name of each of the one or more operands.

In one aspect, the random tree classifier includes a first stage and a second stage. The first stage includes a first random forest that is trained on a first subset of the features, a second random forest trained on a second subset of the features, and a linear classifier that is trained on all the features. In one aspect, the first subset and the second subset differ. The second stage includes a third random forest that is trained on each probability generated from the first random forest, the second random forest, and a linear classifier.

A method is disclosed comprising: extracting, on a computing device having at least one processor and a memory, features that represent a context of a use of an uninitialized variable as a reference parameter in a method invocation that returns an integral result in a source code program; inputting the extracted features into a random forest classifier model; and obtaining a label from the random forest classifier model that indicates whether or not the extracted features indicate use of the uninitialized variable represents a runtime error.

The extracted features include method name, return type of the method invocation, type of the reference parameter, and number of parameters in the method invocation. The extracted features may further include operators of a conditional expression using a return value of the method invocation.

In one aspect, the random forest classifier model is a two-stage model having a first stage and a second stage. The first stage includes a first random forest that is trained on a first subset of the extracted features, a second random forest that is trained on a second subset of the extracted features, and a linear classifier that is trained on all the extracted features. The first subset and the second subset differ. The second stage includes a third random forest that is trained on a probability generated from the first random forest, the second random forest, and the linear classifier.

The method further comprises: generating a syntax-type tree for a function of the source code program; traversing the syntax-tree tree to find a subtree representing use of an uninitialized variable as a reference parameter in a method invocation that returns an integral result; and obtaining the extracted features from the subtree. In another aspect, the method further comprises utilizing the random forest classifier in a software development tool.

A device is disclosed having a processor and a memory. The processor is configured to perform actions that: obtains, from a method of a source code program, features associated with an arithmetic expression in a function of a source code program; and uses a random forest classifier to classify the features into one of two classes, wherein a first one of the classes indicates that the features represent an arithmetic overflow, the second one of the classes indicates that the features do not represent an arithmetic overflow.

In one aspect, the features include one or more operand names, types for the one or more operands, sizes of the one or more operands, values of the one or more operands, order of operands, and label. The features may further include assigned-to type, assigned-to size, and assigned-to variable name.

In one aspect, the processor is further configured to perform actions that: generate a syntax tree having type information for the function; and traverse the syntax tree to extract the features. In one or more aspects, the random forest classifier is part of a software development tool.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method, comprising:
collecting a first plurality of source code snippets having an arithmetic expression corrected to fix an arithmetic overflow error;
extracting a plurality of first features from each of the first plurality of source code snippets;
transforming the plurality of first features into a first training dataset;
training a machine learning model to identify the arithmetic overflow error using the first training dataset;
collecting a second plurality of source code snippets having an arithmetic expression not having been fixed to correct the arithmetic overflow error;
extracting a plurality of second features from each of the second plurality of source code snippets;
transforming the plurality of second features into a second training dataset; and
training the machine learning model to identify the arithmetic overflow error using the second training dataset.

2. The computer-implemented method of claim 1, wherein the first features include an operand type, operand size, operand name and operand size for each operand of the arithmetic expression of each of the first plurality of source code snippets.

3. The computer-implemented method of claim 1, wherein the first features include an order of operands in the arithmetic expression, assigned-to type, assigned-to size, and/or assigned-to variable name in the arithmetic expression.

4. The computer-implemented method of claim 1, wherein the first features include a label indicating the first features represent the arithmetic overflow.

5. The computer-implemented method of claim 1, wherein the second features include a label indicating the second features represent no arithmetic overflow.

6. The computer-implemented method of claim 1, wherein the second features include an operand type, operand size, operand name and operand size for each operand of the arithmetic expression of each of the first plurality of source code snippets.

7. The computer-implemented method of claim 2, wherein the second features include an order of operands in the arithmetic expression, assigned-to type, assigned-to size, and/or assigned-to variable name in the arithmetic expression.

8. A computer-implemented method, comprising:
obtaining a first training dataset of first features extracted from source code methods having experienced a runtime error and source code methods without having experienced the runtime error;
training a first machine learning model using the first training dataset to learn to predict a first probability of the runtime error based on the first features;
obtaining a second training dataset of second features extracted from the source code methods having experienced the runtime error and source code methods without having experienced the runtime error;
training a second machine learning model with the second training dataset to learn to predict a second probability of the runtime error based on the second features; and
training a fourth machine learning model with the output from the first machine learning model and the output from the second machine learning model to infer the runtime error.

9. The computer-implemented method of claim 8, further comprising:
obtaining a third training dataset of features extracted from the source code methods having experienced the runtime error and the source code methods not having experienced the runtime error;
training a third machine learning model with the third training dataset to output a third probability of the runtime error; and
training the fourth machine learning model with the output from the third machine learning model.

10. The computer-implemented method of claim 8, wherein the first features include a method name and a label.

11. The computer-implemented method of claim 8, wherein the second features include a return type, a reference type and a label.

12. The computer-implemented method of claim 9, wherein the third features include a method name, return type, reference type, argument count, path and label.

13. The computer-implemented method of claim 9, wherein the third machine learning model is a linear classifier with a Bag-of-Words encoder.

14. The computer-implemented method of claim 8 wherein the runtime error is a conditionally uninitialized variable.

15. The computer-implemented method of claim 8, wherein the first machine learning model, the second machine learning model and the third machine learning model are random forest classifiers.

* * * * *